358-69. OR 3,301,944 SR

SEARCH ROOM

TG 532

Jan. 31, 1967 B. H. J. CORNELISSEN ETAL 3,301,944

CIRCUIT ARRANGEMENT FOR USE IN A COLOUR TELEVISION RECEIVER

Filed Sept. 10, 1963 2 Sheets-Sheet 1

INVENTORS
BERNARDUS H.J. CORNELISSEN
HENDRIK BREIMER
BY
Frank R. Trifari
AGENT

CIRCUIT ARRANGEMENT FOR USE IN A COLOUR TELEVISION RECEIVER

Filed Sept. 10, 1963 2 Sheets-Sheet 2

INVENTORS
BERNARDUS H.J.CORNELISSEN
HENDRIK BREIMER
BY
Frank R. Jerfani
AGENT

United States Patent Office 3,301,944
Patented Jan. 31, 1967

3,301,944
CIRCUIT ARRANGEMENT FOR USE IN A COLOUR TELEVISION RECEIVER

Bernardus Henricus Jozef Cornelissen and Hendrik Breimer, both of Emmasingel, Eindhoven, Netherlands, assignors to North American Philips Company, Inc., New York, N.Y., a corporation of Delaware Filed Sept. 10, 1963, Ser. No. 307,877
Claims priority, application Netherlands, Sept. 12, 1962, 283,158
5 Claims. (Cl. 178—5.4)

The invention relates to a circuit arrangement for use in a colour television receiver, said arrangement comprising an indexing tube having a gun for producing an electron beam and a display screen composed of groups of colour strips, run-in strips and indexing strips, comprising furthermore means for producing a run-in signal and an indexing signal when the electron beam scans the run-in strips and the indexing strips respectively, and means for converting the indexing signal into a switching signal on which the colour signals are modulated, the latter means comprising a dividing circuit, and the arrangement comprising a gate circuit for switching the monochrome signal on and off.

In United States patent application Serial No. 307,871, filed September 10, 1963, it is described that during the scan of the indexing strips the beam current must not drop below a given minimum value, since otherwise the dividing circuit stops operating and the colour reproduction ceases.

It is desirable to provide a fixed value for the beam current during the scan of the run-in strips, during which scan a starting signal is produced by means of which the dividing circuit is started, so that starting in the correct phase can be guaranteed.

It is therefore necessary to switch off the monochrome signal containing the brightness information during the scan of the run-in strips, since if the monochrome signal is fed, independently of the absence or presence of the indexing signal produced in the receiver, to a control-electrode of the gun of the indexing tube, it may impart to the beam current such a high value, in the bright, white parts of the image to be reproduced, that the start of the dividing circuit in the correct phase is not ensured. Moreover the monochrome signal may contain components, the frequency of which corresponds with that of the starting signal, so that the dividing circuit may start in an incorrect phase.

It has, therefore, been proposed to derive a voltage from the dividing circuit, which voltage switches on the monochrome signal not until the dividing circuit has started. This involves, however, that in the event the dividing circuit stops operating, not only the colour reproduction but also the monochrome signal stop.

The measure for preventing the value of the beam current from dropping below a given level during the scan of the indexing strips provides sufficient certainty against stopping of the dividing circuit, it is true, but in practice this appears not to be so under all conditions.

The minimum beam current is adjusted by providing a constant voltage, independent of the supplied video signal, between the Wehnelt cylinder and the cathode of the gun of the indexing tube.

However, when very bright white parts of the reproduced image are followed by black parts of long duration, the high voltage of the indexing tube will drop slightly, in spite of the stabilization, during the bright white parts. This involves a deterioration of the focusing, so that the spot of the electron beam is enlarged. Thus the amplitude of the light pulse captured by the photo-multiplier (when use is made of indexing strips radiating ultraviolet light) becomes smaller, whereas the duration of this pulse becomes greater. This involves that the desired signal of the indexing frequency has a smaller amplitude. Moreover, due to the decreasing high voltage, in spite of a constant voltage between the Wehnelt cylinder and the cathode, the beam current will decrease slightly. Even if indexing strips having a high secondary-emission coefficient are used, the two aforesaid effects will occur.

If the bright white parts are followed by black parts, the high voltage cannot be restored sufficiently rapidly, so that the two aforesaid effects bring about an excessively small amplitude of the indexing signal obtained from the photo-multiplier, so that the dividing circuit does not remain operative. If these black parts are of longer duration, also the fly-wheel effect of the dividing circuit is not capable of preventing the dividing circuit from stopping. If upon the stopping of the dividing circuit both the colour signal and the monochrome signal cease, only black traces would be visible after the occurrence of the very bright white parts.

In accordance with the invention steps can be taken for preventing the monochrome signal from stopping, when the dividing circuit stops operation, although the colour ceases, even when the monochrome signal is switched off during the start, the arrangement then being characterized in that the gate circuit for switching the monochrome signal on and off is controlled by a control-signal derived from a bistable trigger circuit, which is moved into one stable state at the termination of a horizontal deflection of the electron beam and into the other stable state at the start of the dividing circuit during the consecutive horizontal deflection, said control-signal cutting off the gate circuit either from the termination of a horizontal deflection until the start of the dividing circuit at the next-following horizontal deflection or from the beginning of a horizontal deflection until the start of the dividing circuit.

It should be noted that it is known from French patent specification 1,250,253 to arrange the indexing pattern so that, when scanned by the electron beam, not only the frequency of the starting signal but also the frequency of the indexing signal are produced. If for some reason or other the dividing circuit stops, the starting signal is immediately thereupon available, so that the dividing circuit can be restarted in the correct phase. Due to such a run-in pattern, cross-talk between the colour signal and the indexing signal re-occurs. However, the indexing strips arranged at a relative distance differing from that between two corresponding colour strips are provided for the very purpose of avoiding said cross-talk. Without this difference in the relative distances, a dividing circuit would be superfluous. By causing the indexing pattern to supply both a signal of the frequency of the starting signal and a signal of the frequency of the indexing signal, the cross-talk avoided by the aforesaid arrangement of the indexing strips appears again, which is undesirable.

A few possible embodiments of circuit arrangements according to the invention will now be described with reference to the accompanying drawings, of which FIG. 1 shows a first embodiment in which the voltage produced is supplied to the cathode of the indexing tube;

Figure 1:
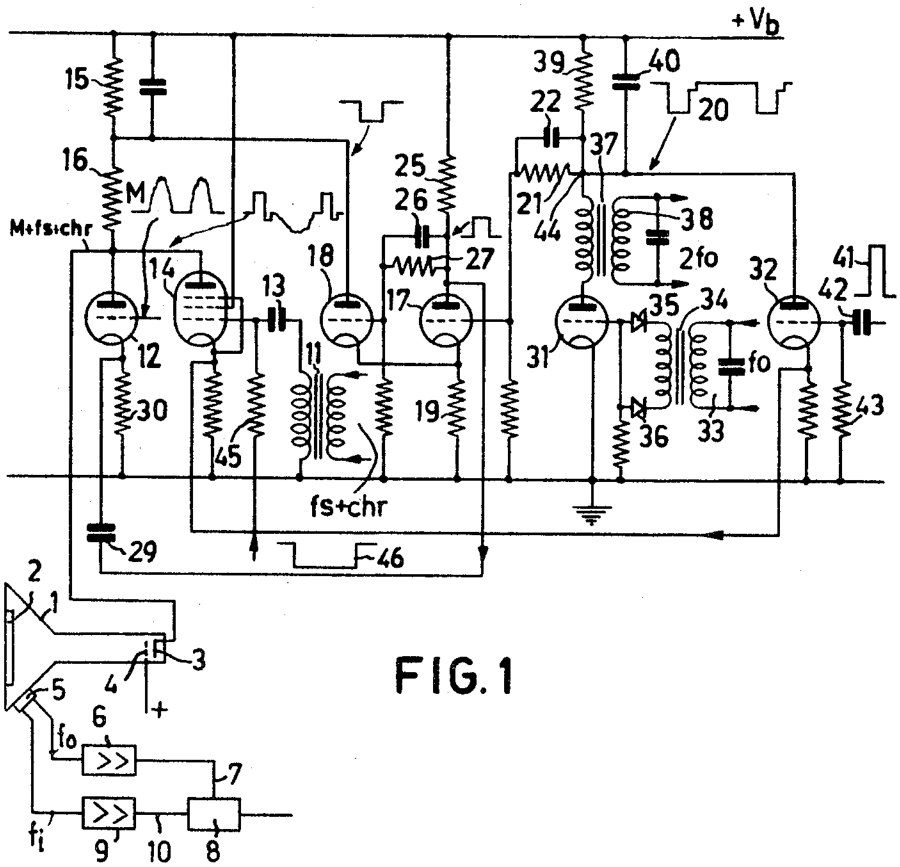

As shown in FIG. 1 the display tube 1 is an indexing tube, the display screen 2 of which is composed of groups of colour strips, run-in strips and indexing strips. During the scan of the screen 2 by the electron beam, which is produced by the gun consisting of the cathode 3 and the Wehnelt cylinder 4, a run-in signal and subsequently an indexing signal are produced. The run-in or starting signal is fed via the photo-multiplier 5 and the amplifier 6, tuned to the frequency $f_o$ of the starting signal, to a first input terminal 7 of the dividing circuit 8. During the scan of the indexing strips the indexing signal is fed via the photo-multiplier 5 and the amplifier 9, tuned to the frequency $f_i$ of the indexing signal, to a second input terminal 10 of the dividing circuit 8. The signal obtained from the dividing circuit 8 is processed further, so that finally a switching signal of the frequency $f_s$ is produced, on which the colour signal is modulated and which can be fed to the gun of the indexing tube 1 for the reproduction of the colours. This signal, which is symbolically indicated in FIG. 1 by $f_s$+chr is supplied to the primary winding of a transformer 11.

Moreover, a monochrome signal M is produced in the receiver, said signal containing the brightness information for the image to be displayed, this signal must finally also be fed to the gun of the display tube 1. This monochrome signal M is supplied in the arrangement shown in FIG. 1 to the control-grid of a valve 12. The monochrome signal M and the colour signal $f_s$+chr are combined as follows. The colour signal $f_s$+chr is fed via the secondary winding of the transformer 11 and the capacitor 13 to the control-grid of the pentode 14. The anodes of the valves 12 and 14 are connected to each other and connected via the common anode resistors 15 and 16 to the supply voltage source, which supplies a voltage of $+V_b$ volts. The interconnected anodes of the valves 12 and 14 are furthermore connected to the cathode 3 of the indexing tube 1. Consequently, this cathode receives the overall video signal M+$f_s$+chr.

As stated in the preamble especially the monochrome signal must be switched off during the scan of the run-in strips, since otherwise the electron beam does not exhibit a constant value during the scan of said strips; this is not conductive to the start of the dividing circuit in the correct phase. The monochrome signal can be switched off in a very simple manner by deriving a voltage from the dividing circuit 8, which voltage renders the valve 12 conducting only when the dividing circuit 8 has started in the correct phase. However, if for some reason or other, referred to in the preamble, the dividing circuit 8 stops operating, also the signal rendering the valve 12 conducting will cease, so that the monochrome signal M is cut off. Since at the inoperation of the dividing circuit 8 the colour signal $f_s$+chr ceases automatically, there will no longer be anything reproduced during the remaining part of a horizontal deflection due to the simultaneous absence of the monochrome signal M.

In accordance with the invention it should be avoided at any rate that after the dividing circuit stops also the monochrome signal ceases, whilst the measure for switching off the monochrome signal at least during the start of the dividing circuit must be maintained. To this end there is provided a trigger circuit, which is moved into one stable state when the dividing circuit 8 has started during a horizontal deflection and which is moved into the other stable state at the termination of the same horizontal deflection. By deriving the switching pulses for the valve 12 from said trigger circuit, it is ensured that the valve 12 is rendered conducting when the dividing circuit 8 has started, whereas it is cut off not until the termination of the same horizontal deflection.

Figure 2:
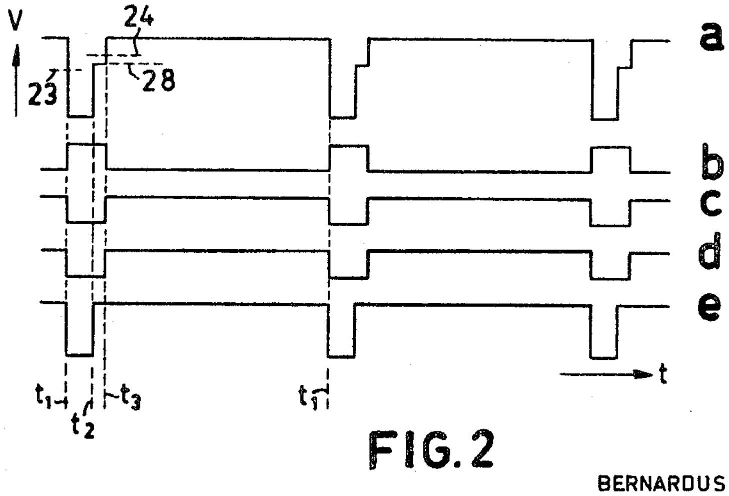
FIG. 2 illustrates a number of voltages produced in the arrangement shown in FIG. 1.

This is carried out as follows. The trigger circuit comprises the triodes 17 and 18, the cathodes of which are connected to each other and to earth via the common cathode resistor 19. To the control-grid of the valve 17 is fed a signal 20 via the parallel combination of a resistor 21 and a capacitor 22. The voltage 20 is illustrated in FIG. 2*a*; it will cut off the valve 17 as soon as it exceeds the level indicated by the broken line 23, whereas it renders the valve 17 conducting, when it exceeds the level indicated by the broken line 24. This means that the valve 17 is cut off at the instant $t_1$ and rendered conducting at the instant $t_3$, so that due to the presence of the anode resistor 25 a voltage is produced at the anode, which voltage is illustrated in FIG. 2*b*. The valve 18, to the control-grid of which is fed the signal produced at the anode of the valve 17 via the parallel combination of a capacitor 26 and a resistor 27, is thus controlled in the opposite sense, so that due to the presence of the resistor 15, a voltage as shown in FIG. 2*c* is produced at its anode.

Because the trigger circuit is changed over to the different stable states on two different voltage levels, i.e. the levels indicated by the lines 23 and 24, it can be ensured that the trigger circuit does not return to its initial position when the dividing circuit becomes inoperative. If the dividing circuit starts at the instant $t_3$, the trigger circuit arrives in one stable state and if for some reason or other the dividing circuit becomes inoperative, the voltage 20 drops to a given level, say the level indicated by the broken line 28 in FIG. 2*a*. However, when provisions are taken that the last-mentioned level lies above the voltage level indicated by the line 23, the valve 17 is not cut off and the trigger circuit stays in the stable state adjusted at the instant $t_3$. This means that the voltage illustrated in FIGS. 2*b* and 2*c* are not varied.

If one of the voltages derived from the trigger circuit is employed for controlling the gate circuit 12, the latter can be switched on at the instant of starting of the dividing circuit 8, but the gate circuit is switched off independently of the fall-out of the dividing circuit and only dependently upon the termination of the horizontal deflection. This is achieved in the arrangement shown in FIG. 1 by connecting the anode of the valve 17 via the coupling capacitor 29 to the cathode of the valve 12, so that the required cut-off pulse can be produced across the cathode resistor 30.

The control-voltage 20 for the valve 17 can be produced as follows. The arrangement shown in FIG. 1 comprises the valves 31 and 32. The valve 31 forms part of the dividing circuit 8, i.e. of the part in which a signal of the frequency $f_o$ is produced, when the dividing circuit has started, and when the signal of the frequency $f_i$ is available at the input terminal 10. This signal of the frequency $f_o$ is fed to the circuit 33, which is tuned to this frequency, and then via the transformer 34 to two diodes 35 and 36, which double the frequency of the signal fed to the circuit 33 by double rectification and supply the signal to the control-grid of the valve 31. The valve 31 will amplify the frequency-doubled signal and supply it via the transformer 37 to a circuit 38 which is tuned to the frequency $2f_o$, after which the signal thus obtained can be fed to further parts of the dividing circuit.

An anode resistor 39, shunted by a capacitor 40 for the signal of the frequency $2f_o$, is connected in series with the primary winding of the transformer 37. Since the anodes of the diodes 35 and 36 are connected to the control-grid of the valve 31, a negative voltage will be produced, in the presence of the signal of the frequency $f_o$, which voltages reduces the current passing through the valve 31, so that the voltage drop across the resistor 39 decreases. The signal will be fed to the circuit 33 from the instant of starting of the dividing circuit 8 until at the termination of the same horizontal deflection the electron beam is suppressed in the tube 1, or in other words, at the instant of suppression of the electron beam the signal fed to the circuit 33 falls off and hence the negative voltage at the control-grid of the valve 31. Consequently, the resistor 39 will have produced across it a voltage as illustrated in FIG. 2*d*, when the operation of the valve 32 is left out of consideration.

If, on the contrary, only the operation of the valve 32 is considered, the resistor 39 has produced across it a pulse illustrated in FIG. 2*e* due to the fact that the control-grid of the valve 32 receives a horizontal fly-back pulse 41 via the capacitor 42 and the leakage resistor 43. Across the resistor 39 is therefore produced, by the effect of the valves 31 and 32 together, a signal as shown in FIG. 2*a*, which represents the desired voltage 20, which must be fed as a control-voltage to the valve 17.

From FIG. 2*e*, which shows the voltage across the resistor 39, and which is due to the supplied fly-back pulse 41, it will be seen that the fly-back time is determined by the period of time from $t_1$ to $t_2$. Therefore, the instant $t_2$ is the beginning of a horizontal deflection. The instant $t_3$ corresponds with the instant of starting of the dividing circuit 8. It follows therefrom that the valve 31 conveys current from the instant $t_2$ to the instant $t_3$ and that the voltage at point 44 is determined during this period by the level indicated by the line 28. If, therefore, during the scan of the indexing strips proper, i.e. the time after the instant $t_3$ when the dividing circuit has started, for some reason or other the dividing circuit becomes inoperative, the voltage at point 44 drops at the most to the level of the line 28. By the adjustment of the trigger circuit the level indicated by the line 23 lies below that indicated by the line 28, so that the aforesaid condition is fulfilled that at the inoperation of the dividing circuit the trigger circuit should not return to the other stable state.

Although in the foregoing the description refers to a valve 31 which forms part of the dividing circuit, it will be obvious that the information about the start of the dividing circuit 8 may also be derived from a different point of the circuit. Any point after the dividing circuit is suitable to this end, since a satisfactory output signal can only be derived from the dividing circuit 8, when the latter has started in the correct phase.

In the arrangement shown in FIG. 1 it is furthermore shown that the anode of the valve 18 is connected to the tapping of the resistors 15 and 16. This serves to produce an additional pulse during the period of time $t_2$–$t_3$, which pulse raises the beam current to a higher value during the start of the dividing circuit than the minimum value below which the beam current must not drop during the scan of the indexing strips.

Via the resistor 45 a vertical fly-back pulse 46 is fed to the control-grid of the valve 14 in order to suppress the electron beam 1 during the vertical fly-back.

It should finally be noted that it is desirable in the arrangement shown in FIG. 1 for the black porches of the monochrome signal M to cut off the anode current of the valve 12, since in this case, after the cut-off pulse fed via the coupling capacitor 29 has released the anode current through the valve 12, the anode current then starting to flow will have just the value determined by the monochrome signal M.

Figures 3, 4:
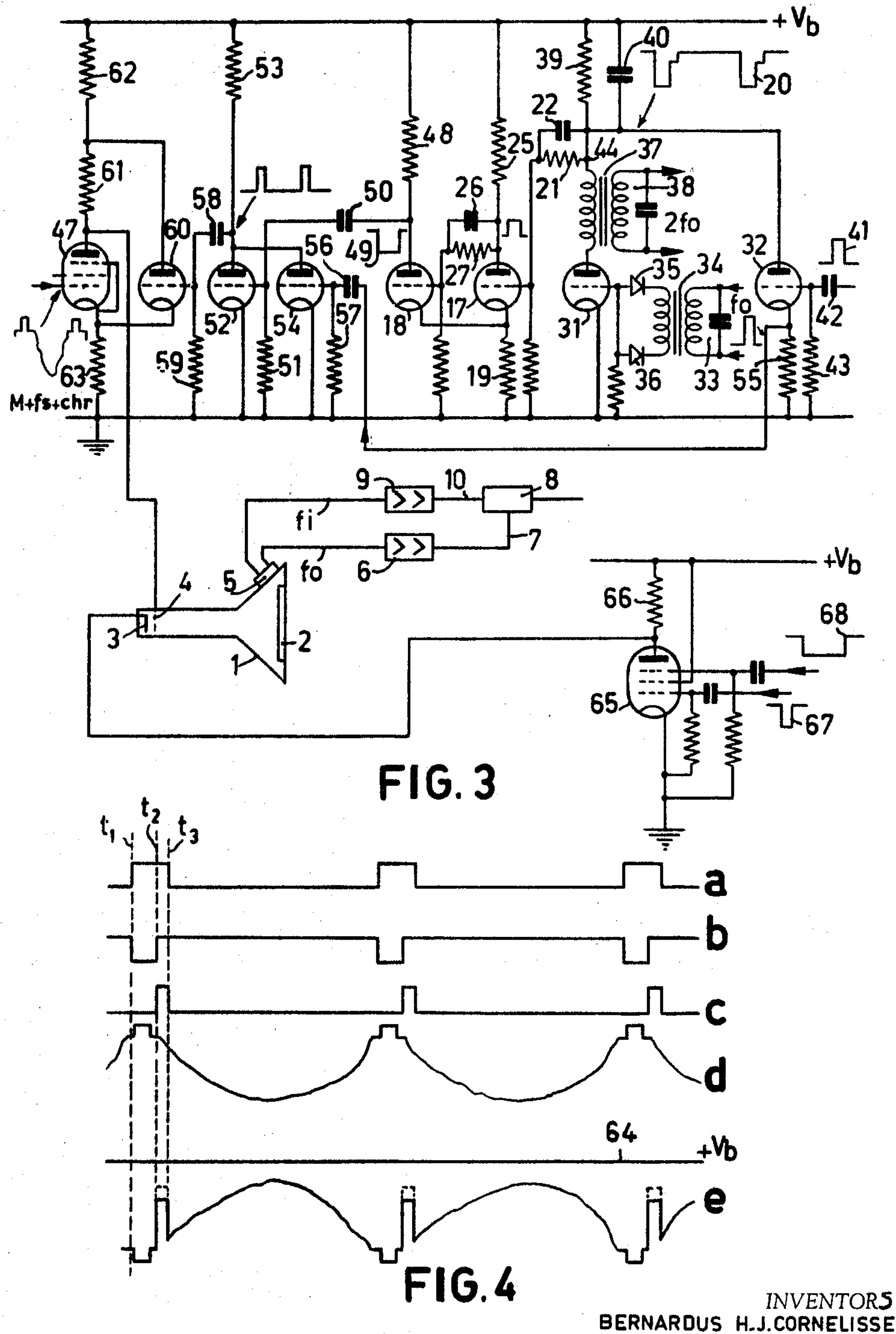
FIG. 3 shows a second embodiment in which the voltage produced is fed to the Wehnelt cylinder of the indexing tube and FIG. 4 illustrates a number of voltages produced in the arrangement of FIG. 3.

From FIG. 1 it will appear that the monochrome signal M and the colour signal $f_s$+chr are combined across the resistors 15 and 16. Therefore, only the monochrome signal will be switched on and off, whereas the colour signal will not be supplied. The colour signal can also be switched, however, when the signal M+$f_s$+chr is fed as a whole to the video output tube. This is illustrated in FIG. 3, in which the output tube 47 receives the total video signal, in this case the monochrome signal plus the colour signal. As a matter of course, also the tube 47 can be cut off during the termination of a horizontal deflection until the start of the dividing circuit 8 during the subsequent horizontal deflection, but in the arrangement shown in FIG. 3 a different method is chosen, i.e. a method in which the valve 47 is cut off with respect to the video signal from the instant $t_2$ to the instant $t_3$. Before this period of time the electron beam is already suppressed, i.e. from the instant $t_1$ to the instant $t_2$, so that suppression of the video signal during the period of the horizontal fly-back has little use. Moreover, a pulse can be simply produced in the output signal of the valve 47, which raises the beam current to a desirable comparatively high value during the scan of the run-in strips, so that a satisfactory start of the dividing circuit is ensured. The pulse having a duration from $t_2$ to $t_3$ is obtained as follows:

From the anode of the valve 18 with the anode resistor 48 is derived a pulse 49, the waveform of which is shown in FIG. 2*c*. This pulse is fed via the capacitor 50 and the leakage resistor 51 to the control-grid of the valve 52, across the anode resistor 53 of which, when not considering the effect of valve 54, a pulse is produced as is shown in FIG. 4*a*. The control-grid of the valve 54 receives a fly-back pulse produced across the cathode resistor 55 of the valve 32, via the capacitor 56 and the leakage resistor 57. Leaving the valve 52 out of consideration, this pulse will produce across the resistor 53 a pulse of the kind shown in FIG. 4*b*. The valves 54 and 52, in common, produce therefore a pulse as shown in FIG. 4*c*, which has a duration from the instant $t_2$ to the instant $t_3$.

This pulse is fed via the capacitor 58 and the leakage resistor 59 to the control-grid of the valve 60, the cathode of which is connected to the cathode of the video output tube 47 and the anode of which is connected to the tapping of the resistor 61 and 62, which serve as a load for the tube 47. The cathodes of the valves 47 and 60 are connected to earth via the common cathode resistor 63.

During the appearance of the control-pulse at the control-grid of the valve 60, this valve will convey a very high current, so that a high positive pulse is produced across the cathode resistor 63. The valve 47 is thus cut off and the video signal cannot produce a signal across the resistors 61 and 62. It is thus achieved that the video signal cannot reach the Wehnelt cylinder 4, to which the anode of the tube 47 is connected .

This is illustrated in FIGS. 4*d* and 4*e*. FIG. 4*d* shows the video signal $M+f_s$+chr, which is fed to the control-grid of the tube 47. In this figure the switching signal with the colour signal modulated thereon is omitted for the sake of clarity, but it will be apparent that tthis switching signal is superimposed as a sinusoidal oscillation on the monochrome signal.

If the anode of the valve 60 were not connected to the junction of the resistor 61 and 62, the anode voltage of the tube 47 would assume the voltage level indicated by the line 64 in FIG. 4*d* for the period from $t_2$ to $t_3$. However, since the valve 60 conveys current during said period, the pulse height of the pulse of the duration from $t_2$ to $t_3$ will be reduced by the voltage drop across the resistor 62. By the choice of the resistors 61 and 62, the peak of said pulse can be adjusted to any desired value and hence the beam current flowing during said period, which is required for a correct start of the dividing circuit 8.

In the arrangement shown in FIG. 3 the cathode 3 of the indexing tube 1 must be adjusted to a fixed value. This is achieved by means of a pentode 65, which produces across the anode resistor 66 such a voltage drop that the cathode 3 obtains the correct adjustment. Moreover, the first and the second control-grid of the valve 65 receive a horizontal fly-back pulse 67 and a vertical fly-back pulse 68 respectively in order to suppress the electron beam of the indexing tube 1 during the horizontal fly-back and the vertical fly-back.

The advantage of the arrangement shown in FIG. 3 consists interalia in that both the monochrome signal and the switching signal are switched off until the dividing circuit has started. This advantage may be accounted for as follows.

When the display screen 2 is scanned, there will pass a certain period of time between the scan of the run-in strips and the supply of the switching signal of the frequency $f_s$, on which the colour signals are modulated to a control-electrode of the tube 1 due to the finite transit time in the arrangement between the photo-multiplier 5 and the input electrode of the tube 1.

It is furthermore important whether the run-in strips produce, during the scan by the electron beam, not only a starting signal of the frequency $f_0$ but also a signal of the frequency $f_i$. In general this should occur and this involves two possibilities. The first possibility consists in that the signal of the frequency $f_i$, available during the start, is smoothly replaced by the signal of the frequency $f_i$, subsequent to the start. The second possibility may be that the replacement is not performed smoothly, which may involve a phase error. This situation may even differ from one horizontal deflection to the other. In the second case the run-in channel must not be switched off immediately; this must be delayed until the correct signal of the frequency $f_i$ is fed to the dividing circuit 8 via the amplifier 9. The instant of switching-off of the run-in channel will in this case be considerably later than in the first case. This involves the risk of the switching signal of the frequency $f_s$ being already fed to the tube 1 before the run-in channel is switched off. This switching signal of the frequency $f_s$, subsequent to mixing with the frequency $f_i$ of the run-in pattern, will provide a component of the frequency $f_0$, the phase of which differs from that of the signal of the frequency $f_0$, supplied by the run-in pattern. This unwanted signal is capable of causing the dividing circuit to start in an incorrect phase. In the second case it is therefore necessary to take steps that the switching signal of the frequency $f_s$ does not reach the input electrode of the tube 1 before the run-in channel is switched off. In the arrangement shown in FIG. 3 this can be achieved in a simple manner by a correct choice of the RC-times of this arrangement, since a certain period of time will elapse until the signal produced at point 44 will cut off the valve 60. Since the cut-off of the tube 60 brings about the opening of the tube 47, it is ensured that the signal of the frequency $f_s$ reaches the tube 1 not until the run-in channel has been switched off.

If, on the other hand, the first possibility prevails, i.e., a smooth replacement of a signal of the frequency $f_i$ after the start, the arrangement shown in FIG. 1 yields the same results as the arrangement of FIG. 3.

It will be obvious that instead of the valves shown in FIGS. 1 and 3 transistors may be employed as circuit elements.

What is claimed is:

1. In a color television receiver of the type having an indexing cathode ray tube with a screen, and an electron gun for directing an electron beam to said screen, and said screen has run-in strips on one side thereof, and indexing strips and color strips in the image area thereof, whereby said electron beam impinges on said run-in strips before said indexing strips during each horizontal deflection, and means for producing run-in signals and indexing signals when said beam is directed toward said run-in strips and indexing strips respectively, said receiver comprising a source of monochrome signals, frequency dividing means for converting said indexing signals to a switching signal, a source of color signals modulated on said switching signal, gate circuit means for applying said monochrome signals to said electron gun, means for applying said color signals modulated on said switching signal to said electron gun for modulating said beam, and control circuit means for controlling said gate circuit means, said control circuit means comprising bistable circuit means, means responsive to the starting of said dividing circuit during a horizontal deflection period for setting said bistable circuit means to one stable state, and means for setting said bistable circuit means to the other stable state during the time between the end of a horizontal deflection and the beginning of the next horizontal deflection, whereby said monochrome signal is continuously applied to said electron gun after the first starting of said dividing means during each horizontal deflection.

2. The circuit of claim 1 in which said gate circuit means comprises an amplifier device for amplifying said monochrome and color signals.

3. The circuit of claim 1 in which said gate circuit means comprises an electron discharge device having a cathode, a control grid, an an anode, comprising means for applying said monochrome signal to said control grid, a second electron discharge device having a cathode, a control grid, and an anode, a common cathode resistor connected to the cathodes of said first and second devices, means for connecting said bistable circuit means to the cathode of said second device, and means for connecting the anode of said first device to said electron gun, whereby said first device is rendered non-conductive for each horizontal deflection until said dividing circuit starts.

4. The receiver of claim 1 wherein said means for setting said bistable circuit means to said first state comprises means for producing a first pulse having a duration from the end of each horizontal deflection to the time said dividing means starts in the next horizontal deflection, and said means for setting said bistable circuit means to said second state comprises a source of flyback pulses of the same polarity as said first pulse, comprising common resistor load means, means for applying said first and said flyback pulses to said common load means, and means applying the voltage across said common load means to said bistable circuit means.

5. The receiver of claim 4 in which said means for producing said first pulse is part of said dividing means, and comprises an amplifying device for amplifying signals in said dividing means, said amplifying device having a control electrodes, and means connected to said control electrode for producing a voltage at said control electrode that reduces current passing through said device whenever said dividing circuit is operating.

References Cited by the Examiner

UNITED STATES PATENTS

| | | | |
|---|---|---|---|
| 2,945,087 | 7/1960 | Graham et al. | 178—5.4 |
| 3,109,886 | 11/1963 | Boothroyd | 178—5.4 |

ROBERT L. GRIFFIN, *Acting Primary Examiner.*

J. H. SCOTT, J. A. O'BRIEN, *Assistant Examiners.*